United States Patent Office 3,450,354
Patented June 17, 1969

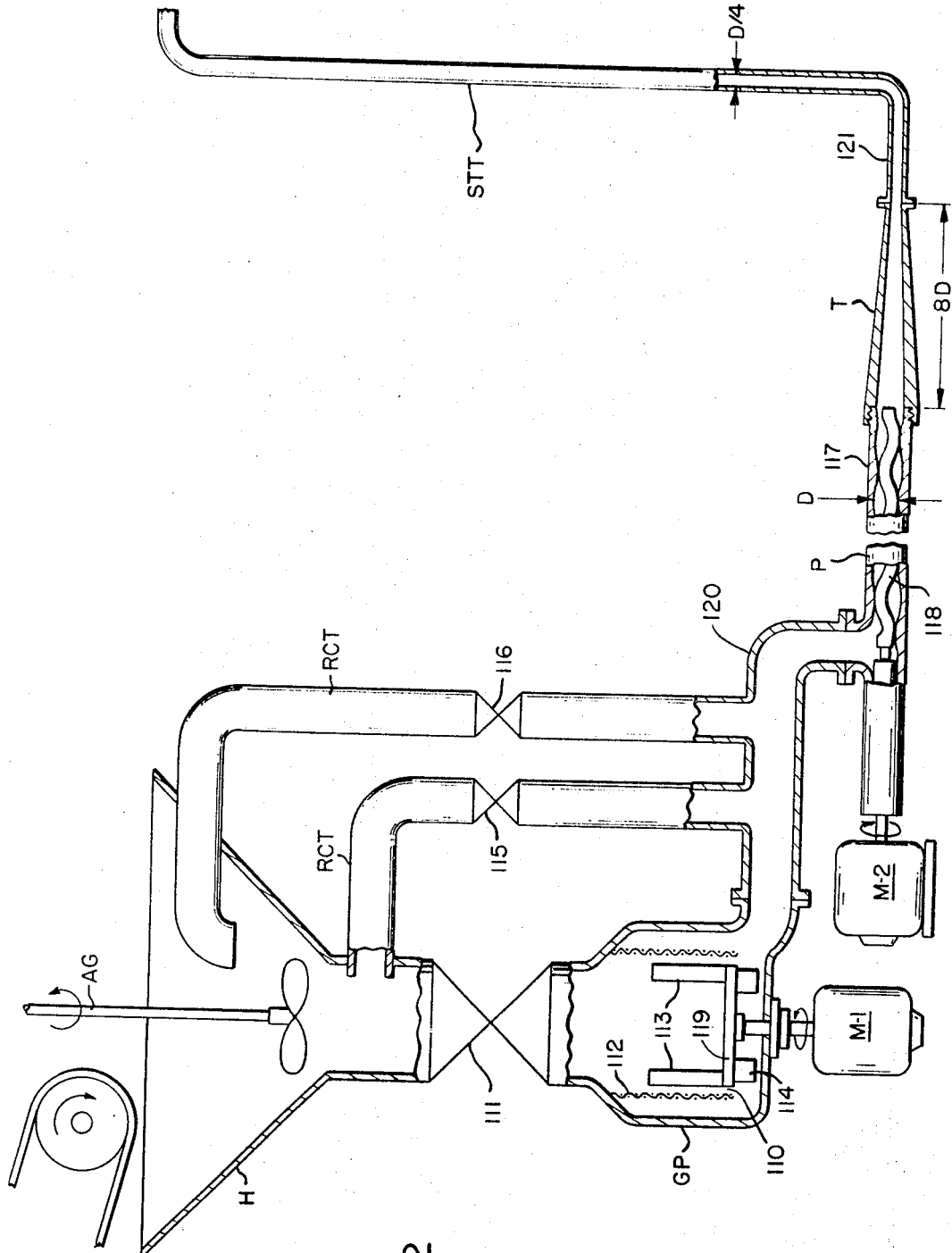

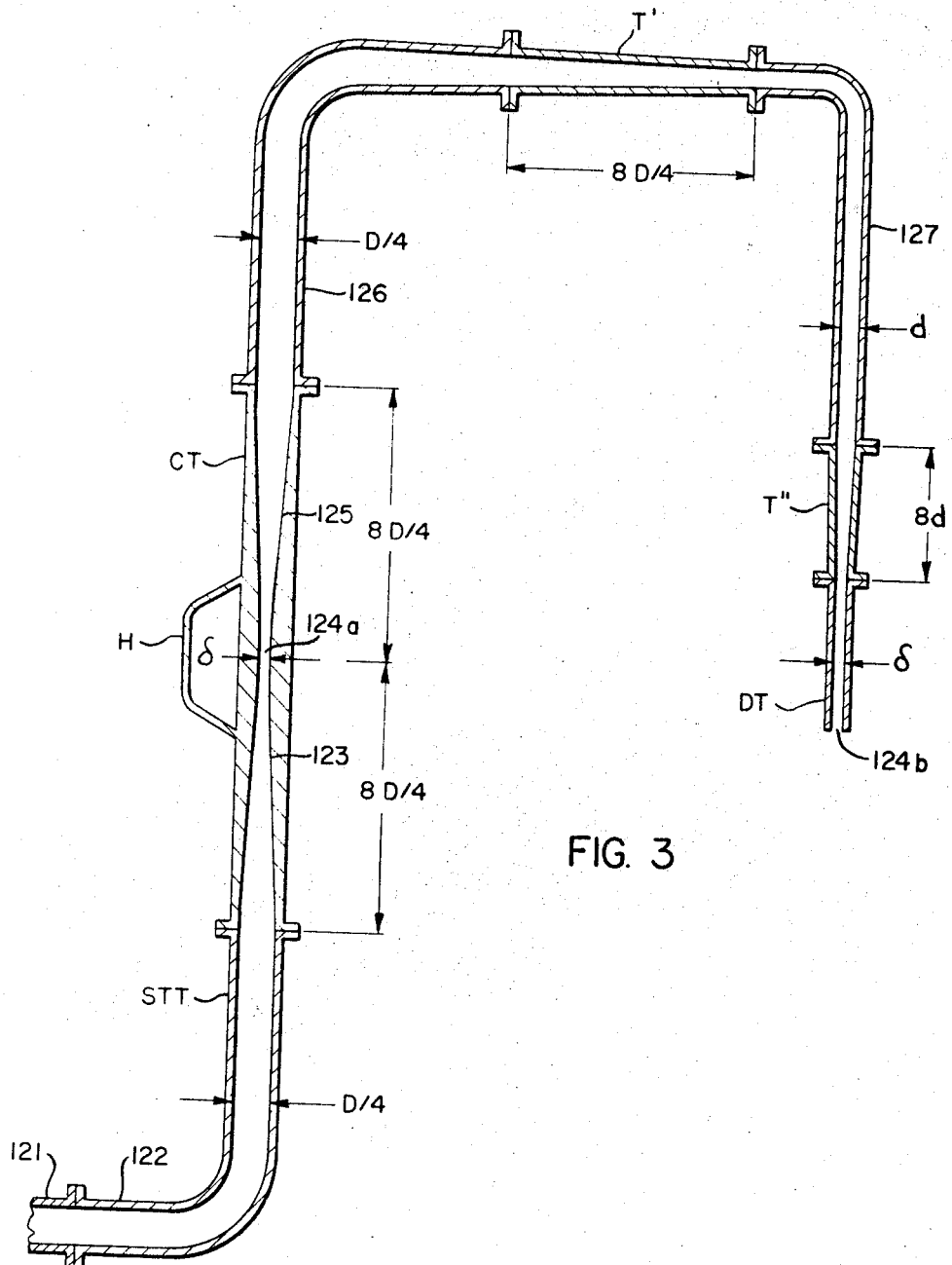

3,450,354
ENCLOSED TRANSPORT APPARATUS AND PROCESS
Theodore Helfgott, Mount Holly, and Paul J. Webber, Marlton, N.J., assignors to Ritter Pfaudler Corporation, Rochester, N.Y., a corporation of New York
Filed Dec. 13, 1966, Ser. No. 601,395
Int. Cl. B02c 18/10, 17/16, 19/22
U.S. Cl. 241—43                                 2 Claims

ABSTRACT OF THE DISCLOSURE

Pseudoplastic materials, such as heterogeneous dewatered sewage sludge, are mixed, sheared, pumped and passed through conduit in turbulent flow. The smooth bore conduit is of such dimensions as to maintain turbulence therein, the conduit having transitions in diameter each not more than one-fourth the medial length of its respective transition section. Cooperating agitator, grinder pump and worm pump provide sufficient shear and turbulence to permit such materials to pass through conduit in turbulent flow.

---

This invention relates to a process and apparatus for the transport of pseudoplastic materials, generally, and in particular for transport to and through a conduit. More particularly, this invention relates to a process and apparatus for the enclosed transport of pseudoplastic sewage sludges.

Background of the invention

Relatively little is known about practical transport of pseudoplastic materials, especially enclosed transport by flow. "Pseudoplastic material" for the purposes of the present invention is used for non-Newtonian flowable materials variously designated in the art as pseudoplastic, viscoelastic, thixotropic and/or dilatant in nature. These materials may be liquids, gels, flowable solid-liquid mixtures, flowable particulate solid-gas mixtures, etc. which have in common the property of exhibiting decreased apparent viscosity when subjected to increasing shear force, and are made increasingly mobile or flowable thereby.

Severe problems are encountered in the enclosed transport of pseudoplastic materials by flow. Among these is the problem of how to keep the materials flowable or mobile during and throughout the course of transport through a conduit. Further, among the more important and/or useful pseudoplastic materials are many heterogeneous substances which, in an insufficiently mobile condition, have the tendency to separate into disparate phases and/or layers and/or portions which are enriched in some components and impoverished in others. Thus, another vexing problem is how to keep the sundry components of heterogeneous pseudoplastic materials mixed and uniformly distributed in the material during and throughout transport through a conduit. These problems appear to be substantially aggravated as the transport distance or length of conduit is increased.

Objects

One object of this invention is to provide apparatus and a process for flowing pseudoplastic material through a conduit.

Another object of this invention is to provide apparatus and a process for the transport of pseudoplastic materials through a conduit in a mixed and substantially unlayered and/or unseparated condition.

Other desirable objects of this invention are inherent in and/or will become apparent from the following description and claims when taken in conjunction with the appended drawings wherein like numbers and symbols refer to like elements.

Drawings

FIG. 2 is a view in partial cross section of one embodiment of a shearing and pumping means in cooperation with conduit means suitable for the transport of pseudoplastic materials according to the invention. It shows a shearing and pumping means comprising an agitator, a grinder, a vaned pump and an advancing cavity pump in sequential communication with one another.

FIG. 3 depicts in cross section conduit means suitable, in cooperation with shearing and pumping means, to transport pseudoplastic materials therethrough in turbulent flow.

Summary of invention

Figure 1:
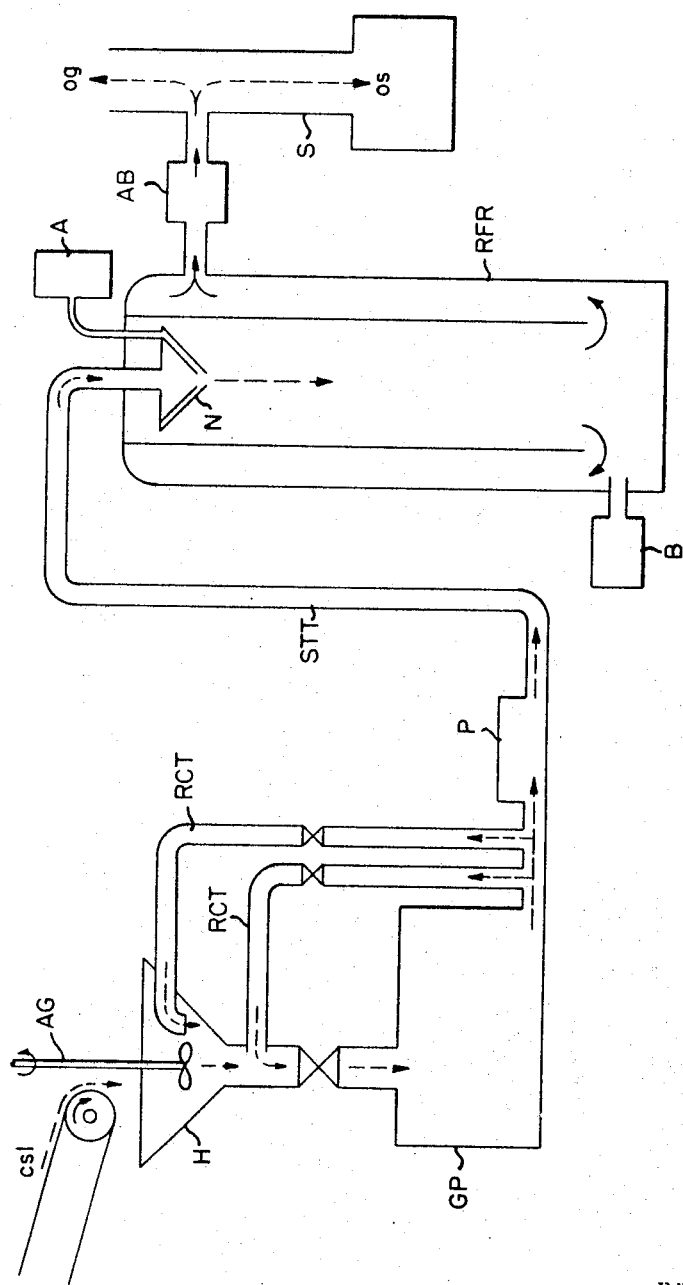
FIG. 1 is a schematic diagram of an embodiment of the transport apparatus of the invention useful in the transport of pseudoplastic materials, especially partially dewatered sewage sludges, to other apparatus for subsequent treatment.

In general, the objects of this invention are attained by transport apparatus for pseudoplastic materials, comprising, in combination (a) shearing and pumping means adapted to shear the pseudoplastic material to make it flowable and to pump said flowable material; and (b) conduit means communicating therewith of such diameter and length as to pass said pumped material therethrough in turbulent flow; and by a process comprising (a) shearing a body of pseudoplastic material so as to make it flowable; (b) pumping the flowable pseudoplastic material; and (c) passing the flowable material in turbulent manner through a conduit means to a point of delivery.

The invention resides, broadly, in discovery that pseudoplastic materials must be sheared to a flowable state and pumped to and through a conduit of such suitable length and diameter that turbulent flow is maintained during passage. Pseudoplastic materials, it has now been found, when pumped through a conduit in laminar flow will shortly become unflowable and/or if the material is of a heterogeneous nature it will shortly form layers or otherwise separate into portions which are enriched in some components and impoverished in other components and/or produce blockage of the conduit.

Thus, according to the invention, it is now found that the practical transport of pseudoplastic materials requires use of suitable conduit means, in cooperation with shearing and pumping means, which conduit is of such length and diameter and has, if changes in conduit diameter are needed, transition segments which are tapered within certain limits of length and diameter, so as to maintain turbulent flow of the material during its passage. A fuller understanding of the invention may be obtained by reference to the drawings and the following explanations.

Embodiments

In FIG. 1, a pseudoplastic material, say partially dewatered sewage sludge cs1, is delivered to the transport apparatus by a moving belt, is (a) prepared for transport, i.e. reduced in apparent viscosity and made flowable through shearing and (b) is pumped to and (c) through conduit means STT in apparatus of the invention for delivery to and subsequent treatment by another apparatus, say reactor RFR. The transport apparatus broadly comprises (a) shearing and pumping means, shown as cooperating agitator AG, grinder and pump GP and pump P, and (b) cooperating conduit means STT.

The material is prepared for transport by being sheared with agitator AG, by being ground and thus further sheared by grinder and pump GP and yet further by being sheared and pumped by pump P. The material is now suitably flowable and is pumped to and through conduit STT which conduit is of such length and diameter as to maintain turbulent flow of the material therethrough by the continued shearing effect of its walls on the turbulently flowing material.

Optionally, recirculation of the ground effluent from grinder and pump GP may be made to further reduce the apparent viscosity of newly received pseudoplastic material in a receiving element H for the continuous, efficient and efficacious operation of the apparatus of this invention. This may be done by opening valves shown as 115 and/or 116 in FIG. 2. In continuous operation, it should be noted for this embodiment that valves 111 and 115 and/or 116 are normally open. Approximately 1 to 33% of the total pumped material from grinder and pump GP is forced into worm or advancing cavity pump P to fully flood it. The further fluidized material is then continuously pumped by grinder and pump GP in substantially two streams. One stream, which comprises a major proportion of material, is recirculated through one or more recirculation tubes RCT back to receiver H which mixes the ground and sheared pseudoplastic material with newly received material cs1, thus to substantially aid the agitator to reduce the apparent viscosity of the newly received material. The second stream from the grinder and pump GP, comprising perhaps about ½ to 1/100 the volume of the recirculated stream, is delivered to advancing cavity pump P, which imparts great shear to the sludge received and thus further substantially reduces the apparent viscosity of this highly thixotropic material, thus enabling it to be continuously pumped through a smooth bore, narrow diameter transport tube STT and thence to an atomizing nozzle N within reactor RFR.

Turning to FIG. 2, receiving element H, acting as a holding or supply vessel for pseudoplastic materials to be transported, is fitted with agitator AG which upon rotation shears the pseudoplastic material to reduce its apparent viscosity so that the material is made mobile to the degree that it may be gravity fed, through optional valve 111, to the chamber defined by housing GP. Within housing GP, at least one support bar 119 is rotatably mounted, its plane of rotation substantially dividing the chamber into an upper space in communication with agitator AG and a lower space. Screen 112 is mounted within housing GP, spaced from its wall, and also spaced from the ends of support bar 119 by gap 110. At least one hammer 113 is mounted on support bar 119 within the upper space and spaced from screen 112. At least one pump vane 114 is mounted on support bar 119 within the lower space. Support bar 119 and its attached hammer 113 and vane 114 are rotated in use by motor M-1. Pseudoplastic material sheared by agitator AG and fed to the chamber defined by housing GP falls into the upper space, is flung by rotating hammer 113 against screen 112 and/or through gap 110, is sheared and ground in the process, and falls into the lower space. There, rotating vane 114 pumps and in so doing shears the material to further reduce its apparent viscosity and to feed the material to advancing cavity pump P through an intervening smooth bore conduit. Pump P has an undulating bore of diameter D defined by stator 117, and has undulating rotor 118 mounted to rotate within the stator cavity so as to advance material fed to it through the stator cavity for delivery to conduit STT. In use, rotor 118 is turned by motor M-2. Advancing cavity pump P pumps the mobile pseudoplastic material fed to it imparting great shear thereto, thus further reducing its apparent viscosity and making it yet more mobile or easily flowable. The material pumped from pump P enters conduit STT through tapered section T which is shown to have length 8D, eight times that of its largest diameter, which diameter is the same as that of pump P cavity. The interior of conduit STT is shown to be of smooth bore with smoothly tapered transitions. To maintain the desired turbulent flow of pseudoplastic material through a conduit we have found that only such smoothly tapered transitions which are from 4 to 40 or more times in length the largest diameter of the tapered transition sections may be used. At lengths less than 4 times the largest diameter, we have found that blockages often occur in attempts to move sundry pseudoplastic materials. Tapered transition sections, which in length greatly exceed about 40 times the largest internal diameter, generally are difficult to fabricate and inordinately expensive. Tapered section T joins pump P to a section of conduit STT with arbitrarily chosen internal diameter D/4, one fourth that of the bore cavity of pump P.

The various elements shown in FIG. 2 peculiarly coact and cooperate to effectively transport pseudoplastic material in a continuous manner. Agitator AG prepares it for grinding through fluidization, both by agitative shear and by mixing with a more mobile ground and pumped material from grinder and pump GP via tubes RCT. The apparent viscosity of such agitatively sheared pseudoplastic material is suitable for delivery, by gravity feed, to grinder and pump GP to maintain grinder and pump GP at full flood, which is usually desirable to effect continuous and efficient pumping and particulation. Grinder and pump GP is suited to particulate, shear and pump pseudoplastic material in adequate volumes and rates of flow so as to force feed pump P at full flow or flood and thus obviate the many "bridging" or blockage effects which might otherwise occur along tubular connections to pump P. Further, grinder and pump GP is particularly suited to recirculate ground material to receiving unit H for admixture with newly received material. Pump P is peculiarly adapted to impart to the pseudoplastic material very great shear forces to yet further fluidize it to the degree necessary to pump it in a continuous manner at full flow or flood to a suitable transport tube STT with no "bridging" or blockages by "slugs" of material. Tube STT, of effective diameter and length, is peculiarly suited to receive and transport the effluent highly mobile sheared pseudoplastic material from worm-pump P to other treatment apparatus. Effective lengths and diameters are those which maintain sufficient agitation and shear of the material as it passes in turbulent flow through the tube so as to prevent layering or blockages during transport.

Conduit means suitable for practice of the invention is shown in FIG. 3. The tube is shown to be of smooth bore throughout with smoothly tapering transitions between sections of different internal diameter. The transition sections are shown to be tapered and exemplarily with a medial length eight times the largest internal diameter of each tapered portion: section CT, a removable section with medial length 16 $D/4$ or 4D having a constriction of diameter delta, $\delta$, is shown to smoothly taper with length 8 $D/4$ from diameter $D/4$ to diameter delta, and then to smoothly taper from diameter delta to diameter $D/4$ in a further medial length 8 $D/4$; section T', joining a section of constant diameter $d$, is shown to smoothly taper therebetween with a medial length 8 $D/4$; section T'', joining a section of constant diameter $d$ to section DT of constant diameter delta, is shown to smoothly taper therebetween with a medial length $8d$. It is to be understood, however, that according to the invention medial lengths of such tapered sections usefully may range from 4 to 40 or more times the largest internal diameter of the tapered portions. FIG. 3 shows constricted removable section CT to have the smallest internal diameter, delta, of the tube. Conduit means with a constricted removable tapered section is particularly useful for passing heterogeneous pseudoplastic materials which may contain particles of such size as to otherwise obstruct the tube at its narrower diameters. In use, the constricted section would be positioned intermediate the conduit ends and upstream to any otherwise substantial narrowing of the bore. The constricted section traps blockage producing particles, and then may conveniently be removed and replaced with another constricted section of clear bore for the continued turbulent flow of pseudoplastic materials through the conduit. Constricted section CT shown, optionally, has handle H to facilitate its rapid removal and/or repositioning. Delivery tip section DT has diameter delta of a size suitable to deliver a desired stream of turbulently flowing pseudoplastic material to apparatus for further treatment and/or storage. Conveniently, and as desired, conduits of the invention may also terminate with tapered sections, e.g. CT, T' and/or T'', or may be of constant internal diameter throughout their length, or indeed may have one or several sections of constant diameters joined by tapered sections according to the teachings herein; further, when the conduit is very short it may be wholly a tube with tapered bore wherein the medial length of the bore is at least four times the largest internal diameter. In certain embodiments, such as when a partially dewatered pseudoplastic sewage sludge is transferred, the practical and useful range of conduit diameters and lengths to maintain turbulent flow has been found to be from about 0.25 to 1 inch in diameter within the length range from about 6 inches to 500 standard equivalent feet (SEF) of pipe. Other pseudoplastic materials, depending upon their nature, may require different ranges of conduit diameters and lengths to maintain turbulent flow throughout.

With regard to the mobility of pseudoplastic materials required to pursue the process of this invention, we have found that, at least for certain embodiments such as partially dewatered sewage sludge, the pseudoplastic materials must fall within the range from about 1 to not greater than about 500±20% centipoise in apparent viscosity for turbulent flow to occur, when employing smooth bore tubes of circular cross section flowing full, i.e. in full flood.

In a typical run, with apparatus similar to that shown in FIGS. 2 and 3, the maximum standard equivalent length of different diameter conduits which may usefully be employed for transporting in turbulent full flow at given flow rates a 14 to 16% solids content partially dewatered sewage sludge is found to be:

| Tube bore diameter, inches | Maximum length SEF | Gallons/minute flow |
| --- | --- | --- |
| 0.25 | 10 | 7 |
|  | 25 | 3 |
|  | 50 | 1.4 |
|  | 100 | 0.4 |
|  | 130 | 0.1 |
| 0.5 | 40 | 32 |
|  | 50 | 27 |
|  | 100 | 11 |
|  | 200 | 1.6 |
|  | 270 | 0.36 |
| 0.75 | 90 | 68 |
|  | 100 | 62 |
|  | 200 | 28 |
|  | 300 | 13.6 |
|  | 400 | 3.7 |
|  | 420 | 1.14 |
| 1.00 | 155 | 100 |
|  | 200 | 70 |
|  | 300 | 37 |
|  | 400 | 20 |
|  | 500 | 7 |
|  | 530 | 2.6 |

We further find that with sewage sludge the apparent viscosity within the aforementioned range will provide the desired turbulent flow through conduits of the specified diameters for such lengths when the pressure drop throughout is maintained at about 200 p.s.i. or less, employing usual and practical pump and tube pressures. In these circumstances, when the pressure drop substantially exceeds about 200 p.s.i., we find that the maximum length is often exceeded for maintaining the apparent viscosity, mobility or flowability of such pseudoplastic materials within the range of Reynolds numbers needed for turbulent flow throughout, and blockages often occur.

*Dewatered sewage sludge, utility and transport*

The technique known as "atomized suspension" was adapted to take raw sewage sludge, atomize it to a mist of minute droplets and oxidize the droplets to easily disposable gaseous and ash products, such as in reactor RFR of FIG. 1. The atomized suspension technique was adapted to this use in efforts to reduce the high expense of prior art methods which involve chemical and biological digestion equipment and procedures.

Although raw sewage sludge, which consists of approximately 0.5% to 6% solids by weight suspended in aqueous fluids, may be used in the atomized suspension technique, we found that it is far more economical to process a partially dewatered sewage sludge, say of about 7% to 35% solids content. Such dewatering may be effected by an apparatus such as is disclosed by O. M. Cocchiarella in U.S. Patent 3,273,494 entitled "Sewage Filter and Press."

Once concentrated, however, the dewatered sewage sludge, and intractable, lumpy, odorous, solid-liquid mixture, exhibits unusual flow properties, characteristic of which are the curious relationships between the apparent viscosity of the thickened sewage sludge at different states of flow and agitation. In this, the sludge has properties of pseudoplastic, thixotropic and/or viscoelastic substances. Such sludge, we have now found, when subjected to substantial shear forces will exhibit reductions in apparent viscosity and be more flowable. Thus, a thickened sludge undergoing a relatively slow rate of shear or turbulence, and thus low shear force, will exhibit a substantially greater resistance to flow than a sludge undergoing rapid flow and/or agitation and thus greater shear force. We have found that as a thickened sludge is progressively and increasingly sheared through flow and/or agitation, it becomes progressively more fluid, and thus may ultimately be moved or urged through a suitable conduit of the invention.

Another attribute of thickened sewage sludge, of some importance to its effective transport, is its tendency to rapidly separate in a conduit when in a slow moving, or a quiescent or static condition, to form layers or slugs which are richer in solids and other layers or slugs which are richer in liquids. Thus, in order that effective transport of concentrated sewage sludge through a conduit be effected, it is important to prevent such layering, for layering provides blockages or at least an uneven quality feed to apparatus used in subsequent treatment, such as reactor RFR, and thus mars the efficiency of treatment apparatus for continuous operaion.

Thickened sewage sludge often contains quantities of grease and fibers, which substances tend to deposit on channel and chamber surfaces, to ball up, and to form mats. When such quantities of grease and fibers are present, they provide an effective deterrent to continuous transport by producing blockages in the transport equipment channels through which the pseudoplastic materials are to be moved.

The foregoing attributes of thickened sewage sludge have, to the advent of the present invention, frustrated success in attempts to continuously transport such sludge through a conduit over any practical distance to apparatus for its subsequent treatment.

The following example is given to illustrate practice of the apparatus and process of the invention in the effective transport of a partially dewatered sewage sludge. It is merely exemplary and, however, it is not definitive nor to be construed as limiting the scope of the invention.

*Example*

A primary sanitary sewage sludge of 5% solids in aqueous suspension is partially dewatered to a solids content of about 14% by weight using the dewatering apparatus of U.S. Patent 3,273,494. The dewatered sludge has a specific gravity of about 1.1 g./cc. and a bulk density 50 lb./cu. ft. The sludge is delivered to the apparatus of the invention as shown in FIGS. 1, 2 and 3 by a conveyor belt at the rate of about 0.33 cu. ft./min. (about 2.5 gal./min.) and is dropped into hopper H of about 65 cu. ft. capacity. The dewatered sludge as received, which has a consistency resembling wet, loose, sticky soil, a heterogeneous mixture of fibers, grease, other organic and inorganic solids and liquids and water, is mixed with the sheared by agitator AG at about 50 r.p.m. to make the sludge more uniform and mobile enough to pass by gravity to the upper space of grinder and vaned pump GP. Grinder and pump GP has the following components and approximate dimensions:

| | |
|---|---|
| Volume of upper space _____cu. in__ | 120 |
| Volume of lower space _____cu. in__ | 120 |
| Length of screen x diameter _____inches__ | 4 x 6 |
| Spacing of screen from housing ____do____ | 1/16 |
| Diameter of support disc _____ do____ | 6 |
| Number of hammers per disc _____ | 4 |
| Length x height x width of hammer _____inches__ | 1 x 1/4 x 1/8 |
| Gap between end of disc and screen _do____ | 1/16 |
| Numbers of vanes per disc _____ | 2 |
| Diameter of conduit leading to pump P. _____inches__ | 2 |
| Length of conduit to pump P _____do____ | 40 |
| Rotation of vanes and hammers ___r.p.m__ | 1,800 |

The sludge falls into the upper space so as to fill it, and is flung by the hammers against and through the screen and through the gap 110 to the lower space. In so doing, the sludge is particulated and subjected to great shear so as to be made so mobile thereby that upon further shearing and pumping by the pump vanes it is pumped through an intervening conduit to worm pump P with no bridging or blockages. Thus, advancing cavity worm pump P is force fed at the rate of about 0.2 to 0.25 cu. ft./min. Advancing cavity pump P has the following components and approximate dimensions:

| | |
|---|---|
| Entry port diameter diameter _____inches__ | 2 |
| Medial length of undulating rotor _____feet__ | 2 |
| Number of undulations/foot _____ | 8 |
| Exit port diameter _____inches__ | 2 |
| Rotation of rotor _____r.p.m__ | 1,000 |

Pump P receives the mobile sludge and passes it therethrough by means of cavity advancement of the undulating space between the stator and revolving rotor, and in so doing imparts great shear and turbulence to the sludge. The pump force feeds the turbulently moving sludge to a conduit means of the invention at the rate of about 0.2 to 0.25 cu. ft./min. The sludge so fed has an apparent viscosity of about 50 centipoises and moves linearly at a rate of about 3 feet per second. The conduit means has the following sequentially joined components and approximate dimensions:

| | |
|---|---|
| Total length in SEF _____ | 30 |
| Transition tube T from pump P: | |
|    Medial length in SEF _____ | 0.875 |
|    Diameter at pump end _____inches__ | 2 |
|    Diameter at other end _____do____ | 0.5 |
| Length of intermediate section in SEF _____ | 4 |
| Diameter of intermediate section _____inch__ | 0.5 |
| Removable section CT: | |
|    Medial length in SEF _____ | 0.667 |
|    Diameter at ends _____inch__ | 0.5 |
|    Diameter at construction _____do____ | 0.25 |
|    Medial distance of constriction from ends inch__ | 4 |
| Length of second intermediate section in SEF ___ | 24.125 |
| Diameter of second intermediate section __inch__ | 0.5 |
| Transition tube and delivery tip DT: | |
|    Medial length in SEF _____ | 0.333 |
|    Diameter at joined end _____inch__ | 0.5 |
|    Diameter at delivery end _____do____ | 0.25 |

The pressure drop of turbulently moving sludge through the conduit means is about 20 p.s.i.g. For this embodiment, since the tapered transition sections contribute very little to the overall length, the overall effective diameter of the tube is about 0.5 inch. The sludge moving in turbulent fashion from the delivery end passes out of the apparatus at a rate of about 0.2 cu. ft./min.

In another run, employing the foregoing apparatus, but by using an activated sludge of about 0.5% solids from a secondary treatment plant dewatered to a solids content of about 12% by weight, and by extending the length of one of the intermediate sections so that the total effective length of the conduit means is about 100 SEF, the turbulently flowing sludge passes from the delivery tip with an overall pressure drop of 40 p.s.i.g. corrected for any elevation height pressure drop.

In yet another run, a 0.5% solids sludge from a primary sedimentation unit dewatered to a 9% solids content is moved through the foregoing apparatus and therefrom as a turbulently flowing material.

In a fourth trial employing the dewatered sludge and apparatus first mentioned, but not using the agitator AG, the sludge does not pass to grinder and pump GP from the hopper.

In a fifth trial, employing the dewatered sludge and apparatus first mentioned, but removing grinder and pump GP from the system by joining the hopper directly to the entry port of advancing cavity pump P, the sludge quickly bridges the entry port and subsequently is not fed to the pump.

In a sixth trial, employing the dewatered sludge and apparatus first mentioned, by removing the advancing cavity pump from the system by joining the conduit means directly to the exit port of grinder and pump GP, turbulence and mobility of the sludge is not adequate to pass the sludge through and out the conduit means; the sludge passed into the tube quickly becomes immobile therein, sets up and plugs the bore.

The aforementioned pressure drops are corrected for an elevation height pressure drop in the conduit of 20 p.s.i.g. which was substracted therefrom.

With regard to the internal elements of the grinder and pump GP, it has been found that a support disc may be used in place of a bar, and in function is equivalent thereto for the purposes of this invention; it has been further found that in place of the screen one may use as an equivalent member a non-perforated rough surfaced element, say a cylinder, against which pseudoplastic materials may be flung by the hammers to be particulated so as to fall through the gap between the cylinder and the support bar to the lower space; yet further it has been found, that in some embodiments using certain pseudoplastic materials, that the grinder and pump GP will pump and feed the worm pump even if there are no vanes in the lower space, in this instance the rotating hammers of the upper space function both as hammers and pump vanes.

We claim:
1. Transport apparatus for pseudoplastic materials adapted to shear said materials to make it flowable and to pump said flowable material including in combination an agitator, a grinder, a vaned pump, and an outlet conduit means in sequential communication with one another, said vaned pump comprising:
   (a) a housing defining a chamber;
   (b) a support bar rotatably mounted within said chamber, the plane of rotation substantially dividing the chamber into
      (i) an upper space in communication with said agitator and
      (ii) a lower space in communication with said outlet conduit means; and
   (c) a vane mounted on said support bar within said lower space.

2. Apparatus according to claim 1 wherein said grinder is disposed within said vaned pump housing, said grinder comprising
   (a) a screen within the upper space in spaced relation to said support bar and said housing;
   (b) a hammer mounted on said support bar within the upper space and spaced from the screen.

(References on following page)

References Cited
UNITED STATES PATENTS

| | | | |
|---|---|---|---|
| 1,825,261 | 9/1931 | Burns et al. | 241—101.6 |
| 1,921,166 | 8/1933 | Peabody | 241—43 |
| 2,515,542 | 7/1950 | Yellott | 241—5 X |
| 2,730,931 | 1/1956 | Reisten | 241—247 X |
| 3,111,278 | 11/1963 | Buschman | 241—246 X |
| 3,170,637 | 2/1965 | Nowlin | 241—186 X |
| 3,347,178 | 10/1967 | Mendoza | 241—246 X |

FRANK T. YOST, *Primary Examiner.*

U.S. Cl. X.R.

241—46.11, 84, 98, 101, 186

PO-1050
(5/69)

UNITED STATES PATENT OFFICE
CERTIFICATE OF CORRECTION

Patent No. 3,450,354      Dated June 17, 1969

Inventor(s) T. Helfgott Et. Al.

It is certified that error appears in the above-identified patent and that said Letters Patent are hereby corrected as shown below:

Column 5, line 51 "3.7" should read --3.4--.

Column 5, line 52 "1.14" should read --1.17--.

Column 6, line 75 "the" should read --and--.

Column 7, line 32 "diameter diameter" should read --diame

Column 7, line 59 "construction" should read --constricti

SIGNED AND
SEALED

OCT 21 1969

(SEAL)
Attest:

Edward M. Fletcher, Jr.
Attesting Officer

WILLIAM E. SCHUYLER, JR.
Commissioner of Patents